United States Patent [19]

Hauri

[11] 4,259,010
[45] Mar. 31, 1981

[54] APPARATUS FOR MEASURING AND EVALUATING A PICTURE PLATE

[75] Inventor: Bernhard Hauri, Staffelbach, Switzerland

[73] Assignee: Kern & Co. AG, Aarau, Switzerland

[21] Appl. No.: 972,861

[22] Filed: Dec. 26, 1978

[30] Foreign Application Priority Data

Dec. 23, 1977 [CH] Switzerland .................. 015942/77

[51] Int. Cl.³ ........................................... G01C 11/12
[52] U.S. Cl. ........................................ 356/2; 33/1 M; 33/20 D
[58] Field of Search ............... 356/2; 33/1 M, 20 D; 355/22, 52

[56] References Cited

U.S. PATENT DOCUMENTS

| | | | |
|---|---|---|---|
| 2,555,106 | 5/1951 | Beazley | 33/20 D |
| 2,941,136 | 6/1960 | Marantette et al. | 33/1 M |
| 3,495,519 | 2/1970 | Alfsen et al. | 33/1 M X |
| 3,659,939 | 5/1972 | Hobrough | 356/2 |
| 3,675,331 | 7/1972 | Ernst et al. | 33/1 M |
| 3,687,547 | 8/1972 | Hobrough et al. | 355/75 |
| 3,777,055 | 12/1973 | Hobrough | 356/2 X |
| 3,918,167 | 11/1975 | Gerber | 33/1 M X |
| 4,057,336 | 11/1977 | Malinge | 33/20 D X |

FOREIGN PATENT DOCUMENTS

1934500 1/1970 Fed. Rep. of Germany .............. 356/2
2624372 12/1976 Fed. Rep. of Germany .

OTHER PUBLICATIONS

Whistler: *R.C.A. Technical Notes,* No. 339, Nov. 1959, 2 sheets.
Technical Bulletin entitled, Analytical Stereoplotter by Marta Optical Division.

*Primary Examiner*—F. L. Evans

[57] ABSTRACT

A restitution instrument for measuring and evaluating picture plates. The instrument includes a mounting stage for mounting the plate. The stage has two edges forming a 90° angle. A carriage means attached to the stage, is used for guiding the stage free of rotation in directions parallel to the edges, i.e., X and Y directions. A drive means is attached to the stage for driving the stage in the X and Y directions along the carriage means. The drive means includes a drive unit slidably mounted to each of the edges and a drive member driven by a drive motor. The member is mounted at 90° to the edge. The member drives the stage in a line of motion perpendicular to the edge. The lines of motion of each of the members intersects at a fixed point whose projection on to the stage falls upon an image point under observation. The drive means includes a measuring means for determining the distance the stage is driven in each of the X and Y directions. A stationary support member is located in close proximity to the image point. The drive members are braced against the member. The apparatus includes an optical observation system for viewing the image point. The system has a measuring mark and a beam splitter prism supported by the support member. The instrument provides increased accuracy and stability when compared with known restitution instruments.

14 Claims, 2 Drawing Figures

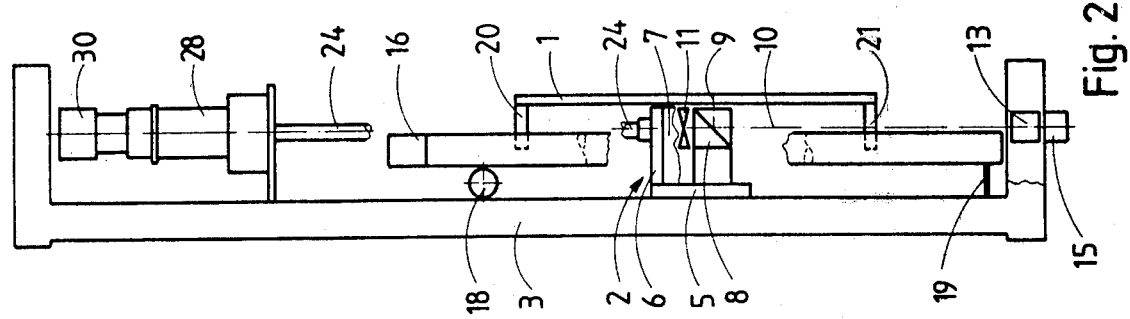
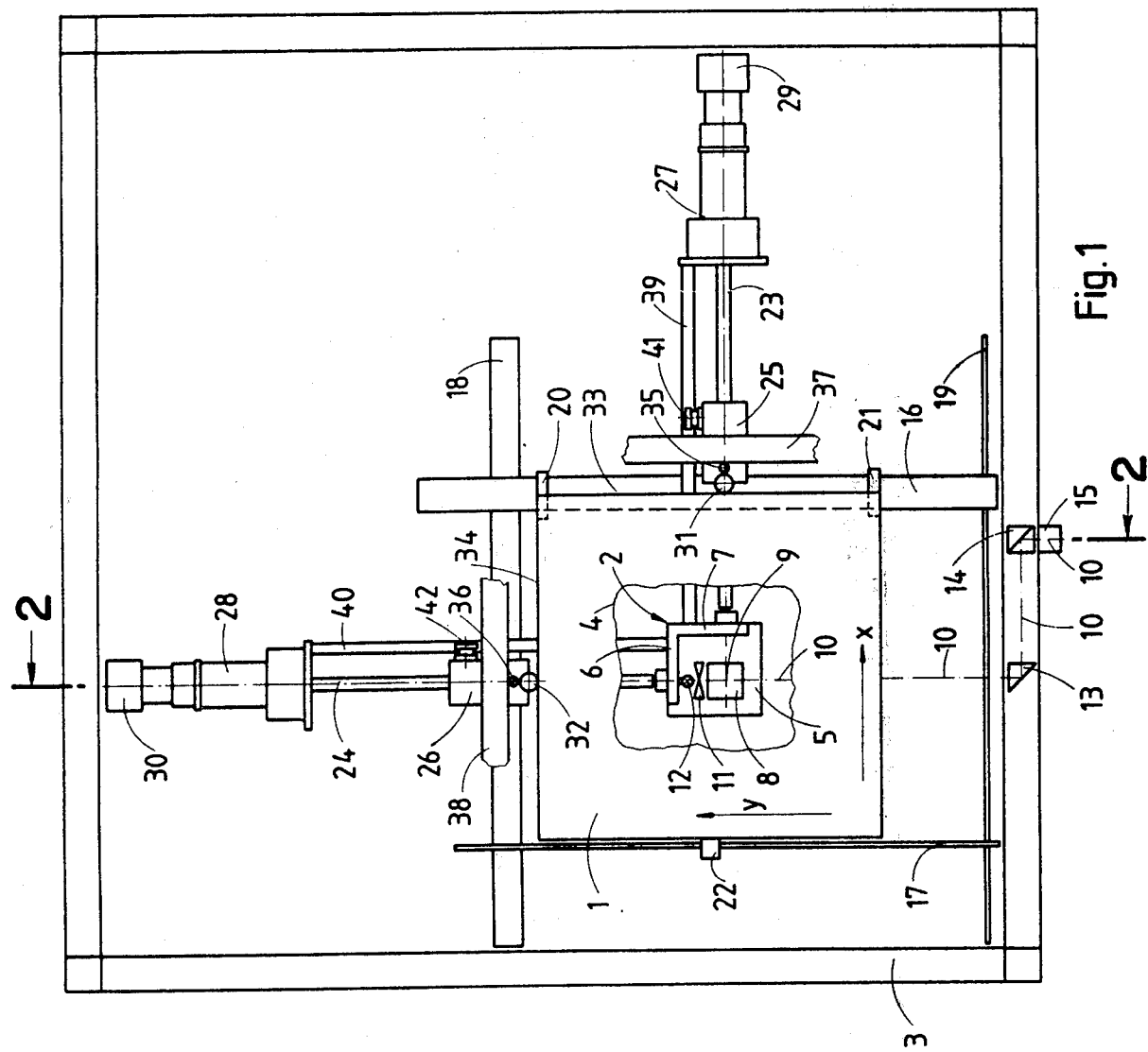

APPARATUS FOR MEASURING AND EVALUATING A PICTURE PLATE

BACKGROUND OF THE INVENTION

This invention relates to restitution instruments for measuring and evaluating picture plates. In particular this invention relates to an instrument for measuring and evaluating picture plates, e.g., photographs, photograms, transparencies, diapositives, and means for positioning such picture plate in the instrument, for graphical restitution, e.g. terrestrial photogrammetry, aereotriangulation, stereo restitution, etc.

By the use of the term "picture plate" it is generally meant to include any image or likeness of an object, person, or scene produced on a flat surface, especially by painting, drawing, or photography, and particularly includes photographs, photograms, transparencies and diapositives.

Devices for positioning picture plates for measurement and evaluation in restitution instruments are available which use a frame to hold the picture plate, e.g. U.S. Pat. No. 3,687,547. The frame is supported by a flat base plate and has two reference surfaces forming a right angle. A geared driving rack engages each of the reference surfaces by a pair of rollers. The rack is driven by a step motor through drive gear. This positioning device is constructed to permit rotation of the frame as well as linear movement. The geared racks pivot about the drive gear and remain perpendicular to the reference surfaces. At the area comprising the points of intersection of the center lines of the geared racks an optical observation system is rigidly mounted for observing given points on the picture plate after the stage has been moved into position with the aid of the step motors.

Since the rotational movements of the stage are not recorded, this positioning device suffers from positioning errors, the magnitude of which is a function of the angle of rotation and the diameter of the drive gears.

An object of this invention is to provide a restitution instrument for the evaluation and measurement of picture plates, including photographs, photograms, transparencies and diapositives, which has increased accuracy and stability when compared with known restitution instruments, at relatively low production costs.

SUMMARY OF THE INVENTION

A restitution instrument is provided for measuring and evaluating a picture plate comprising:

(a) a mounting stage for mounting the picture plate, the mounting stage having two stage edges forming substantially a 90° angle;

(b) a carriage means attached to the mounting stage for guiding the mounting stage substantially free of rotation in directions substantially parallel to the stage edges;

(c) a drive means attached to the mounting stage for driving the stage in the directions along the carriage means, the drive means comprising:

(i) a drive unit slidably mounted to each of the stage edges, each drive unit having a drive member driven by a drive motor, the member being mounted at substantially 90° to the stage edge, the member driving the mounting stage in a line of motion substantially perpendicular to the edge, the lines of motion of each of the members intersecting at a fixed point whose projection on to the mounting stage falls upon an image point under observation; and (ii) a measuring means for determining the distance the mounting stage is driven in each direction;

(d) a stationary support member in close proximity to the image point, the drive members braced thereagainst;

(e) an optical observation system for viewing the image point, the system having a measuring mark and a beam splitter prism supported by the stationary support member.

This invention is particularly characterized by having the beam splitter prism and the measuring mark rigidly mounted on the stationary support member at the image point, i.e. the point of observation and the components of the drive means braced against the stationary support member. Preferably, the drive member is comprised of at least one threaded drive spindle with a rolling nut for moving the mounting stage. A spindle drive motor with an encoder means, e.g. a shaft angle encoder, is mounted on the drive spindle and serves to measure the shift of the mounting stage. Preferably, the rolling nut engages the stage edge by at least one roller, the angular position during its axial movement being controlled by a spindle guide rail. The spindle guide rail can be designed as a cam to compensate for pitch error of the drive spindle.

Precision in measuring the shift of the mounting stage can be increased by selecting materials of construction for the drive spindle, the rolling nut, roller, mounting stage and stationary support member such that the variations in length of the distance between the image point and the stage edge caused by the thermal expansion and contraction of the stage are the same as the variations in the length of the distance between the roller and the center of the stationary support member caused by the combined thermal effect of the drive spindle, rolling nut, roller and stationary support member. By mounting the measuring mark in the immediate vicinity of the image point under observation and at the reference point for the stage driving means, uncontrolled relative shifts between the measuring mark, the image point and driving means are largely eliminated.

Other objects, features and advantages of the invention will be apparent from the following detailed description taken in connection with the accompanying drawings.

BRIEF DESCRIPTION OF THE DRAWINGS

FIG. 1 is a plan view of an embodiment of the instrument of this invention; and

FIG. 2 is a view of the embodiment depicted in FIG. 1, taken along line 2—2 of FIG. 1.

DETAILED DESCRIPTION OF THE INVENTION

Referring to FIGS. 1 and 2, mounting stage (1) serves as a plate carrier or support for the picture plate. Below mounting stage (1) is a stationary support member (2). Stationary support member (2) is rigidly connected with main frame (3). In FIG. 1, the stationary support member (2) can be seen under mounting stage (1), for ease of illustration, through cut-a-way opening (4). The stationary support member (2) is attached to the main frame (3) by support base plate (5). Support base plate (5) is comprised of two support bracket plates (6 & 7), which are constructed of a solid material and form with support base plate (5) a hollow corner cube.

A beam splitter prism (8) is mounted on stationary support member (2). The beam splitter prism (8) deflects at substantially 90°, the light ray (10) originating at the image point (9) on the picture plate. The light ray (10) originates at the image point (9) and penetrates mounting stage (1). The mounting stage (1) is, preferably, constructed of a transparent material, e.g. glass, plastic, etc. In close proximity to beam splitter prism (8) a measuring mark (11) is mounted. The measuring mark (11) is illuminated by a light source (12) e.g. from a light guide of, say, an optical fiber, and imaged into the light ray (10) through beam splitter prism (8). The image point (9) which is under observation is illuminated by a light source (not shown) and observed through viewing eye-piece (15). The light ray (10) passes through beam splitter prism (8) and two deviation prisms (13 & 14) to viewing eye-piece (15).

Any image point (9) in the picture plate can be observed and measured by shifting the mounting stage (1) along the X and Y axis (see FIG. 1) which are perpendicular to each other, and measuring the displacement of the mounting stage (1).

The shifting of the mounting stage (1) is substantially free of rotation. Stage guide bar (16) and stage guide track (17), mounted parallel to the Y axis, are provided as a part of the carriage means for guiding the mounting stage substantially free of rotation in the Y direction. Stage guide bar (16) and stage guide track (17) are linked together and travel along the X axis along stage guide bar (18) and stage guide track (19), which are mounted parallel to the X axis and form a part of the carriage means for guiding the mounting stage substantially free of rotation in a direction substantially parallel to the X axis.

The mounting stage (1) is secured on stage guide bar (16) against a shift in the X direction, and against rotation by two stage support means (20 & 21). Ball bearing means (22) provides for the smooth movement of the mounting stage (1) along stage guide track (17). The travel of stage guide bar (16) and stage guide track (17) along stage guide bar (18) and stage guide track (19) and the securing of the mounting stage (1) thereto is accomplished in a similar manner (not shown).

To shift the mounting stage (1) in the X and/or Y direction drive spindles (23 & 24) are each provided with rolling nuts (25 & 26) as a driving member. The drive spindles (23 & 24) are braced against bracket plates (6 & 7) of stationary support member (2) and held fixed thereto in an axial position. The drive spindles (23 & 24) are driven by two spindle drive motors (27 & 28). Encoder means (29 & 30), e.g. shaft angle encoders, record the angular displacement of the drive spindles (23 & 24). The rolling nuts (25 & 26) have one stage runner each (31 & 32) which engage the stage edges (33 & 34) of mounting stage (1). Stage edges (33 & 34) are precision ground edges. To insure constant contact between stage runners (31 & 32) and stage edges (33 & 34) the rolling nuts (25 & 26) each have a spring loaded spring roller (35 & 36). The spring rollers (35 & 36) engage stage runners (31 & 32) by spring force against stage guide rails (37 & 38) (only partially shown), which are attached to mounting stage (1). This arrangement provides for the mounting stage (1) always being pulled against the stage runners (31 & 32) and rolling nuts (25 & 26).

Spindle guide rails (39 & 40), preferably of tubular construction, are mounted parallel to drive spindles (23 & 24). Spindle guide rails (39 & 40) guide and control the travel and angular position of rolling nuts (25 & 26) by spindle roller (41 & 42) mounted to rolling nuts (25 & 26). The spindle guide rails (39 & 40) may be designed as cams so that pitch errors of the drive spindles (23 & 24) can be compensated for, and thus positional changes in mounting stage (1) are proportional to the angular displacement of drive spindles (23 & 24).

In FIG. 2, for clarity, stage guide bar (16), support bracket plate (7) and drive spindle (24) are shown only in part view, while some components shown in FIG. 1 are not shown at all in FIG. 2.

In use, drive spindles (23 & 24) drive the mounting stage (1) in a line of motion substantially perpendicular to the stage edges (33 & 34), the lines of motion of each of the spindles intersecting at a fixed point whose projection onto the plane of the mounting stage (1) falls onto the image point (9) under observation. The necessary electronic auxilary equipment for supplying power to the spindle drive motors (27 & 28), evaluating and recording the output signals from the encoder means (29 & 30), the light source, etc. (not shown) are well known to those skilled in the art.

This invention provides a restitution instrument having enhanced stability and accuracy in evaluating and measuring picture plates, preferably photographs, photograms, transparencies and diapositives, for restitution purposes. The beam splitter prism (8) with the measuring mark (11) at the end of the observation optics within the stationary support member (2) serves also as a reference for determining the position of mounting stage (1) with the aid of the drive spindles (23 & 24) and encoder means (29 & 30) because the image point (9) is at the intersection of the lines of motion of the drive members, e.g. drive spindles (23 & 24).

If a suitable combination of structural materials are chosen for certain structural elements, e.g. drive spindles (23 & 24) rolling nuts (25 & 26) stage runners (31 & 32), mounting stage (1) and stationary support member (2), then the ever present and unavoidable thermal expansion and contraction effects associated with such elements can be equalized between reference points on stage runners (31 & 32) and the center of the stationary support member (2), on one hand, the image point (9) and the stage edge (33 & 34) on the other hand, at least for one position of the rolling nut (25 & 26) and the mounting stage (1). The encoder means (29 & 30) will then not record a change in position of the image point (9) under observation despite a shift of the stage edges (33 & 34) due to thermal expansion or contraction.

Many variations of the described embodiment are contemplated. For example, the carriage means can be replaced by three omnidirectional rollers mounted to the bottom side of the mounting stage (1) which would allow displacement of the mounting stage (1) in any direction on a flat base plate. In such a situation, the spindle guide rails (39 & 40) would be equipped with gliders mounted in a fixed orientation (not shown), which would fix the angular position of the stage edges (33 & 34) by keeping the stage edges (33 & 34) in contact each with a pair of guide rollers fixed to the respective glider, and a spring roller.

The instrument described herein may also be used for analytic stereo plotting if two stages are used, including all components for measurement, observation and drive means, and arranged e.g. one above the other and the viewing eye-pieces joined in one suitable binocular.

The foregoing detailed description has been given for clearness of understanding only and no unnecessary limitations should be understood therefrom as some modifications will be obvious to those skilled in the art.

What is claimed:

1. A restitution instrument for measuring and evaluating a picture plate comprising:
   (a) a mounting stage for mounting the picture plate, the mounting stage having two stage edges forming substantially a 90° angle;
   (b) a carriage means attached to the mounting stage for guiding the mounting stage substantially free of rotation in directions substantially parallel to the stage edges;
   (c) a drive means attached to the mounting stage for driving the stage in the directions along the carriage means, the drive means comprising:
      (i) a drive unit slidably mounted to each of the stage edges, each drive unit having a drive member driven by a drive motor, the member being mounted at substantially 90° to the stage edge, the member driving the mounting stage in a line of motion substantially perpendicular to the edge, the lines of motion of each of the members intersecting at a fixed point whose projection onto the mounting stage falls upon an image point under observation; and
      (ii) a measuring means for determining the distance the mounting stage is driven in each direction;
   (d) a stationary support member in close proximity to the image point, the drive members braced thereagainst;
   (e) an optical observation system for viewing the image point, the system having a measuring mark and a beam splitter prism supported by the stationary support member.

2. The instrument of claim 1, wherein the drive members are threaded spindles which each have a rolling nut attached thereto with means for engaging the stage edges.

3. The instrument of claim 2, wherein the measuring means is an encoder means for measuring the angular displacement of the spindle.

4. The instrument of claim 1, wherein the stationary support member is a solid hollow corner cube.

5. The instrument of claim 1, further comprised of at least three gliding supports attached to the bottom side of the mounting stage, the supports resting upon a flat base plate whereby the mounting stage may be shifted in any direction.

6. The instrument of claim 1, having two stages for analytic steroplotting.

7. The instrument of claim 1, further comprising a light source for the measuring mark, the beam splitter prism deflecting the image of the measuring mark into the path of a light ray originating at the image point.

8. The instrument of claim 7, wherein the light source is from an optical light conductor.

9. The instrument of claim 2, wherein a spindle guide rail is utilized to maintain the proper angular position of the rolling nut during its axial movement.

10. The instrument of claim 9, wherein the spindle guide rail is a cam which compensates for pitch errors on the spindle.

11. The instrument of claim 2, wherein the materials of construction for the spindles, the rolling nuts, the mounting stage and the stationary support member are selected so that for a single position of the mounting stage the thermal expansion or contraction of the mounting stage between the image point and the stage edge is substantially the same as the combined effect of the spindle, rolling nuts, and stationary support member between the corresponding points on the rolling nuts and the center of the stationary support member.

12. The instrument of claim 2, wherein each rolling nut has a stage runner and a spring roller, the stage runner being rigidly mounted and engaged to a stage edge, and the spring roller being spring mounted and engaged with a stage guide rail which is attached to the mounting stage, the spring roller thereby pressing the mounting stage against the stage runner by spring force.

13. The instrument of claim 2, wherein the rolling nut is engaged with the stage edge by at least one stage runner.

14. The instrument of claim 13, wherein the stage edges are faces machined directly on to the material of the mounting stage.

* * * * *